United States Patent
Rana et al.

(10) Patent No.: US 9,419,774 B2
(45) Date of Patent: Aug. 16, 2016

(54) HYBRID DIPLEXER AND CIRCULATOR FRONTEND FOR GPS RECEIVER AND SATCOM MODEM SHARING COMMON ANTENNA

(71) Applicant: Honeywell International Inc., Morristown, NJ (US)

(72) Inventors: Narayan Singh Rana, Bangalore (IN); Kancharla HariNarayana, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 461 days.

(21) Appl. No.: 14/080,055

(22) Filed: Nov. 14, 2013

(65) Prior Publication Data

US 2015/0131498 A1    May 14, 2015

(51) Int. Cl.
*H04L 5/08* (2006.01)
*H04J 1/02* (2006.01)
*H04B 1/525* (2015.01)

(52) U.S. Cl.
CPC ........ *H04L 5/08* (2013.01); *H04B 1/525* (2013.01); *H04J 1/02* (2013.01)

(58) Field of Classification Search
None
See application file for complete search history.

(56) References Cited

U.S. PATENT DOCUMENTS

| 7,801,493 | B2 | 9/2010 | Do |
| 7,894,779 | B2 | 2/2011 | Meiyappan et al. |
| 8,923,167 | B2 * | 12/2014 | Black ............... H04B 1/109 370/277 |
| 2003/0008667 | A1 | 1/2003 | Forrester |
| 2003/0045244 | A1 | 3/2003 | Lindemann et al. |
| 2014/0354887 | A1 * | 12/2014 | Wu ................ H01Q 1/246 348/706 |

OTHER PUBLICATIONS

European Patent Office, "Extended EP Search Report from EP Application No. 14188380.1 mailed Mar. 5, 2015", "from Foreign Counterpart of U.S. Appl. No. 14/080,055", Mar. 5, 2015, pp. 1-5, Published in: EP.

Maloratsky, "Transceiver Duplexer Design Considerations", Oct. 2008, pp. 68-86, Publisher: Microwave Journal.

* cited by examiner

*Primary Examiner* — Feben M Haile
(74) *Attorney, Agent, or Firm* — Fogg & Powers LLC

(57) ABSTRACT

A hybrid diplexer-circulator system including a circulator and a modified-diplexer is provided. The circulator includes a first circulator-port, a second circulator-port coupled to a first chain comprising a receiver module, and a third circulator-port coupled to a second chain comprising a satellite modem. The first chain receives first-frequency signals and reflects second-frequency signals. The second chain receives the second-frequency signals reflected from the first chain and transmits third-frequency signals. The modified-diplexer includes: a first diplexer-port of the modified-diplexer, which is shared as the first circulator-port; a second diplexer-port; and third diplexer-port in the second chain. The second diplexer port inputs the first-frequency signals from a filter in the first chain. The third diplexer-port: inputs the second-frequency signals reflected by the first chain; outputs the second-frequency signals to be received by the satellite modem; inputs third-frequency signals transmitted by the satellite modem; and outputs the third-frequency signals to the third circulator-port.

20 Claims, 7 Drawing Sheets

HYBRID DIPLEXER AND CIRCULATOR FRONTEND FOR GPS RECEIVER AND SATCOM MODEM SHARING COMMON ANTENNA

BACKGROUND

A diplexer is a passive device that implements frequency domain multiplexing. The ports of a diplexer are frequency selective. Two ports (e.g., port M and port N) are multiplexed onto a third port (e.g., port S). The signals on ports M and N are at different frequency bands. If the different frequency bands are separated by a relatively large frequency difference, the signals on M and N do not interfere with each other. Ideally, all the signal power on port M is transferred to the port S and vice versa. All the signal power on port N is transferred to port S and vice versa. Ideally, the separation of the signals is complete.

A communication system consisting of a global positioning system (GPS) receiver and an Iridium modem connected through a diplexer has problems protecting GPS receiver from the strong Iridium transmit power. In such a configuration, whenever the Iridium modem transmits a signal, the GPS connection is lost because of the GPS receiver is saturated by the strong Iridium transmit signal. An additional filter in GPS path can minimize this effect at the cost of increased insertion loss in GPS path. The same problem occurs with a GPS receiver and an INternational MARitime SATellite (INMARSAT) modem.

FIG. 4 shows a prior art diplexer system 55, in which a GPS receiver 70 and an Iridium modem 90 are connected through a diplexer 50 to a common antenna 35. The common antenna 35 is connected at port-S of the diplexer 50. The Iridium modem 90 is connected to port-N of the diplexer 50. A GPS receiver 70 is connected to port-M of the diplexer 50. The diplexer circuit is designed using a distributed Iridium band pass filter 80 in the Iridium path and a GPS filter 60 in GPS path. The Iridium signal is reflected by GPS filter 60 and the GPS signal gets reflected by the Iridium filter 80 and, after splitting again at port S, these reflected signals are direct toward the respective desired paths. The insertion loss in a diplexer system is greatly determined by the rejection of respective filters at the operating frequency of other receiver/Modem.

The Iridium frequency is at 1616 MHz, and the GPS frequency is at 1575 MHz. This relatively close frequency spacing of only 41 MHz makes it difficult to design a filter having enough rejection at GPS frequency of 1575 MHz and at the same time having low insertion loss at Iridium frequency of 1616 MHz. Also, whenever the Iridium modem transmits, the Iridium signal saturates GPS receiver 70. The conventional diplexer system shown in FIG. 4 is unable to prevent the strong Iridium signal from saturating the GPS receiver 70.

FIG. 5 shows a simulation of the response of the prior art diplexer system 55. The plot labeled 77 is the antenna input from the antenna 35 to the Iridium modem 90 as a function of frequency. The plot labeled 78 is the antenna input from the antenna 35 to the GPS receiver 70 as a function of frequency. The insertion loss in GPS path is close to 3.2 dB and in Iridium path is close to 2 dB. The plot labeled 79 is the input from the Iridium chain to the GPS chain as a function of frequency. The isolation between the Iridium transmitter and GPS receiver path is around 20 dB.

The architecture shown in FIG. 4 is a currently implemented in prior art systems. In this diplexer system 50, when the Iridium modem 90 transmits the GPS sensitivity is reduced because of saturation of GPS receiver 70 and because the loss in GPS path is >3 dB. The increased loss in GPS path is greatly affects the GPS lock time.

SUMMARY

The present application relates to a hybrid diplexer-circulator system. The hybrid diplexer-circulator system includes a circulator and a modified-diplexer. The circulator includes: a first circulator-port communicatively coupled to an antenna; a second circulator-port communicatively coupled to a first chain; and a third circulator-port communicatively coupled to a second chain that includes a satellite modem. The first chain includes a receiver module. The first chain is operable to receive first-frequency signals having a first frequency and to reflect second-frequency signals having a second frequency. The second chain is operable to receive the second-frequency signals reflected from the first chain and to transmit third-frequency signals having a third frequency. The first circulator-port of the circulator is shared as a first diplexer-port of the modified-diplexer. The modified-diplexer further includes a second diplexer-port in the first chain and a third diplexer-port in the second chain. The second diplexer port is communicatively coupled to input the first-frequency signals from a filter in the first chain and communicatively coupled to output the first-frequency signals to a receiver in the first chain. The third diplexer-port is communicatively coupled to: input the second-frequency signals reflected by the first chain; output the second-frequency signals to be received by the satellite modem; input the third-frequency signals transmitted by the satellite modem; and output the third-frequency signals to the third circulator-port.

DRAWINGS

FIGS. 1, 2A, and 2B are block diagrams of embodiments of a hybrid diplexer-circulator system in accordance with the present application;

In accordance with common practice, the various described features are not drawn to scale but are drawn to emphasize features relevant to the present application. Like reference characters denote like elements throughout figures and text.

DETAILED DESCRIPTION

The technology described herein provides a way to prevent saturation of a receiver sharing an antenna with a satellite modem, such an as Iridium modem and an INternational MARitime SATellite (INMARSAT) modem, and potentially eliminates an antenna from an aircraft. The satellite modem is also referred to herein as a satellite communication (SATCOM) modem.

Figure 4:
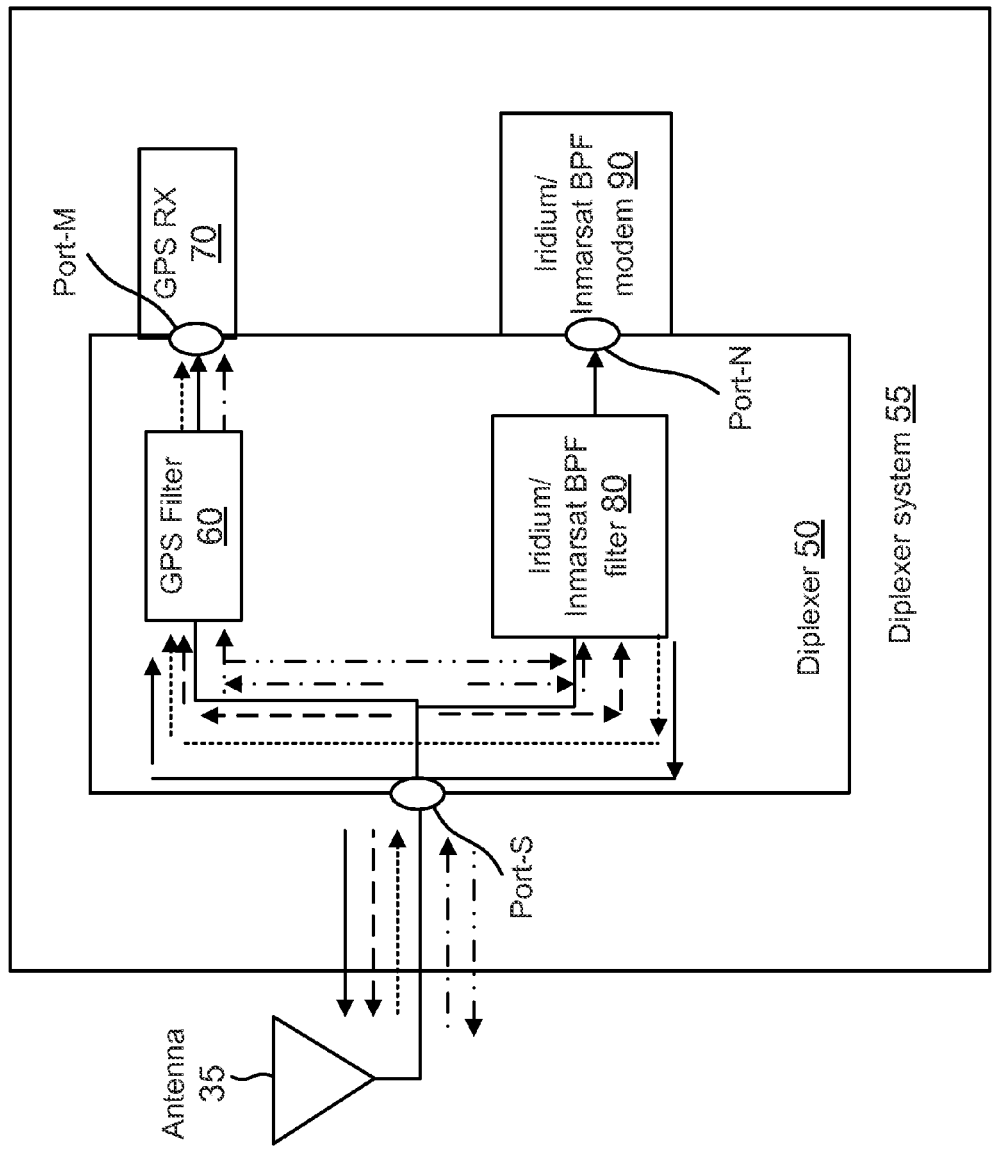
FIG. 4 shows a prior art diplexer system, in which a GPS receiver and an Iridium modem are connected through a diplexer to a common antenna.
Figure 5:
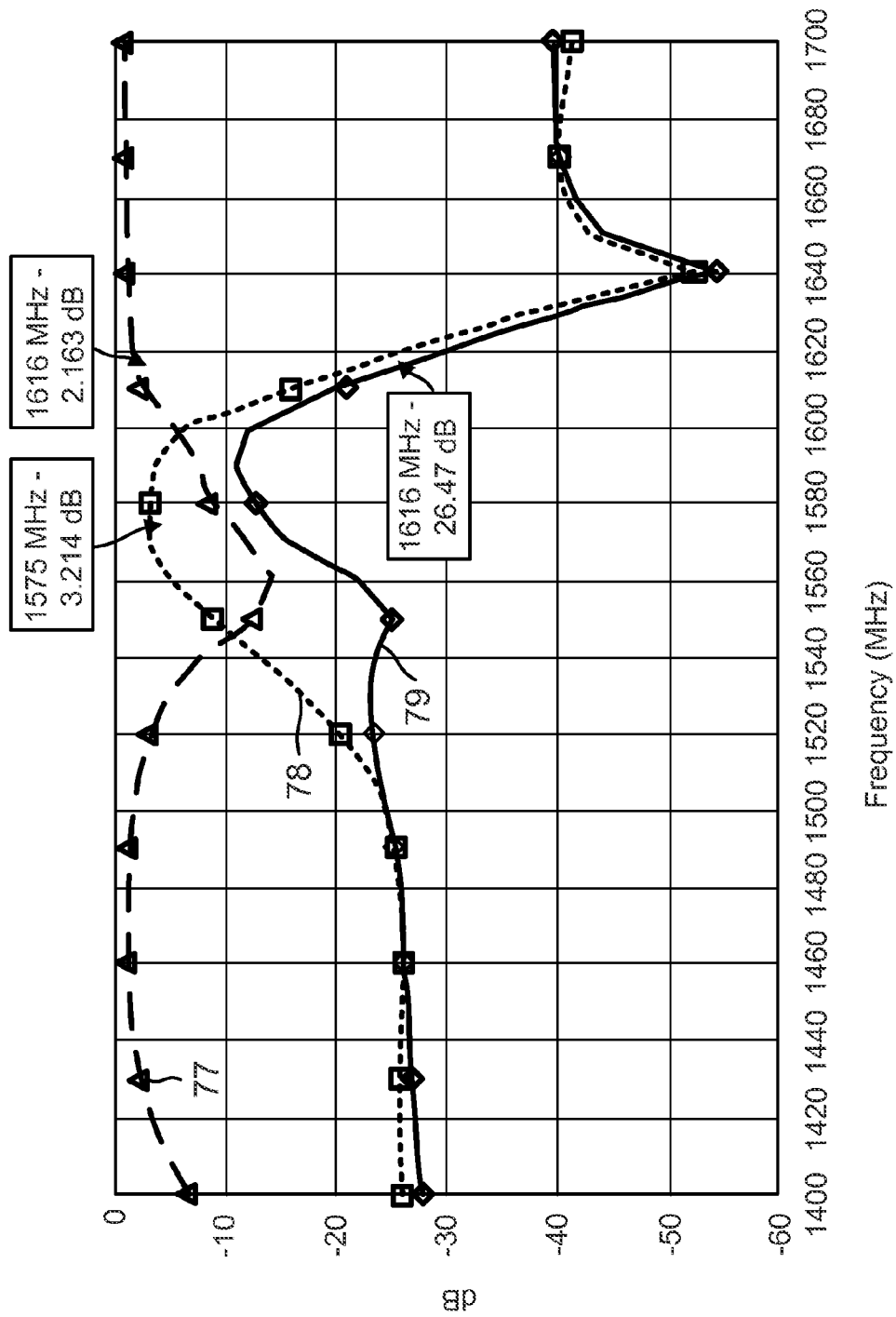
FIG. 5 shows a simulation of the response of the of the prior art diplexer system of FIG. 4.

The architecture described herein resolves the issues described above with reference to the prior art system of FIG. 4. This architecture can be used in any radio frequency (RF) system that includes a modem and a receiver that share a common antenna configured to receive two closely spaced frequencies (e.g., a first frequency and a second frequency) and to transmit a third frequency. In one implementation of this embodiment, the first frequency and second frequency are separated by less than five percent of the first frequency.

Figure 1:
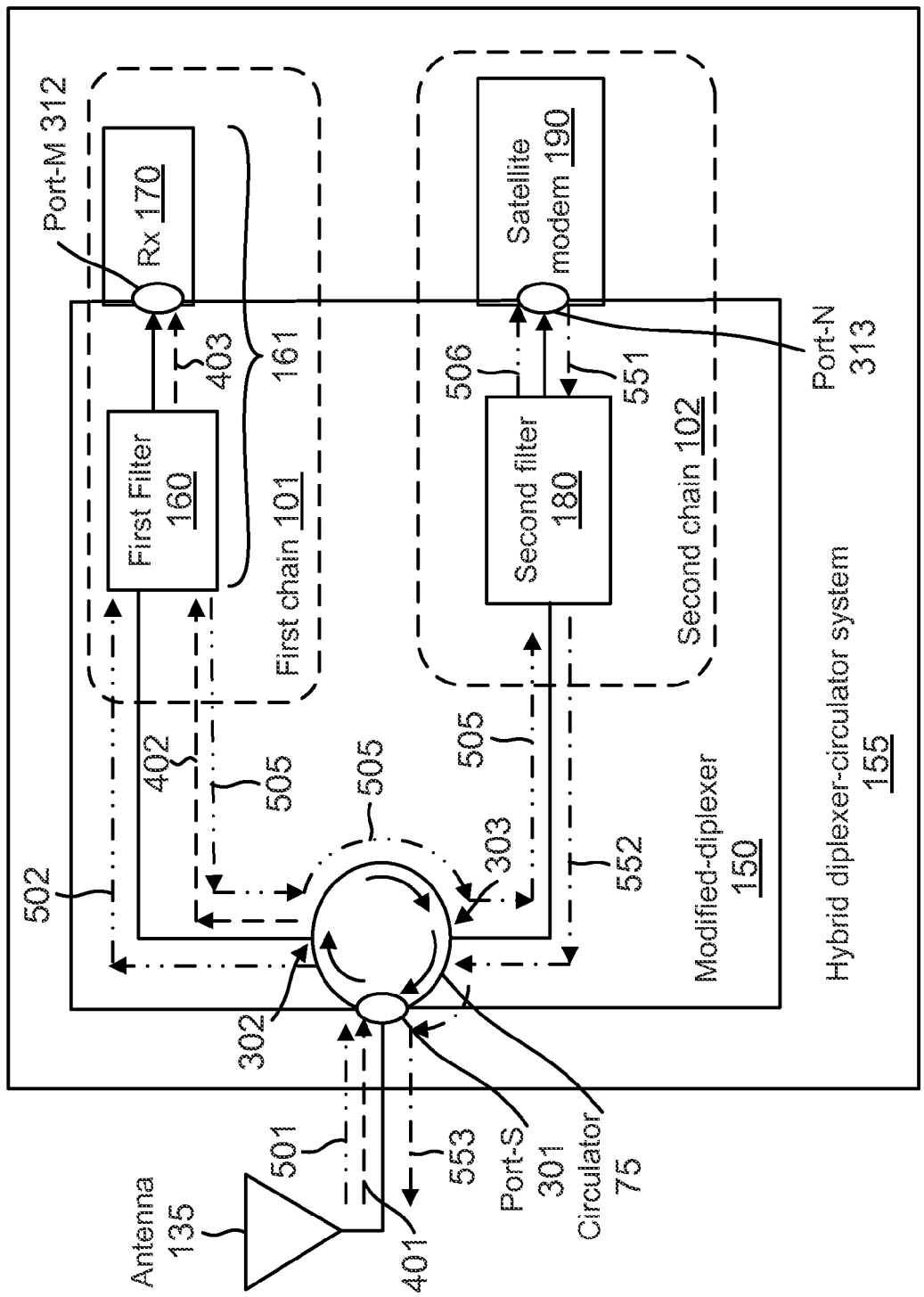
Figure 2A:
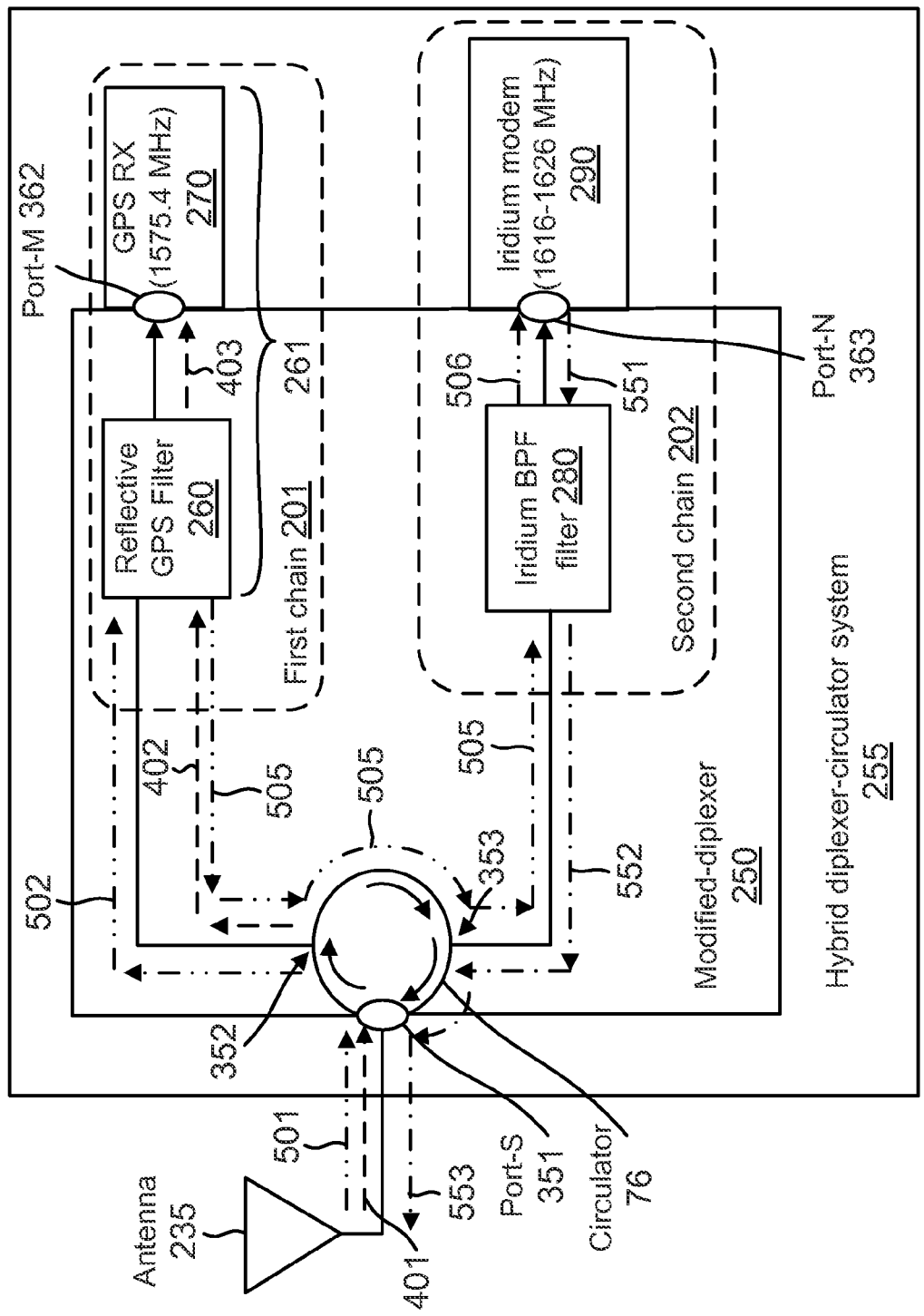
Figure 2B:
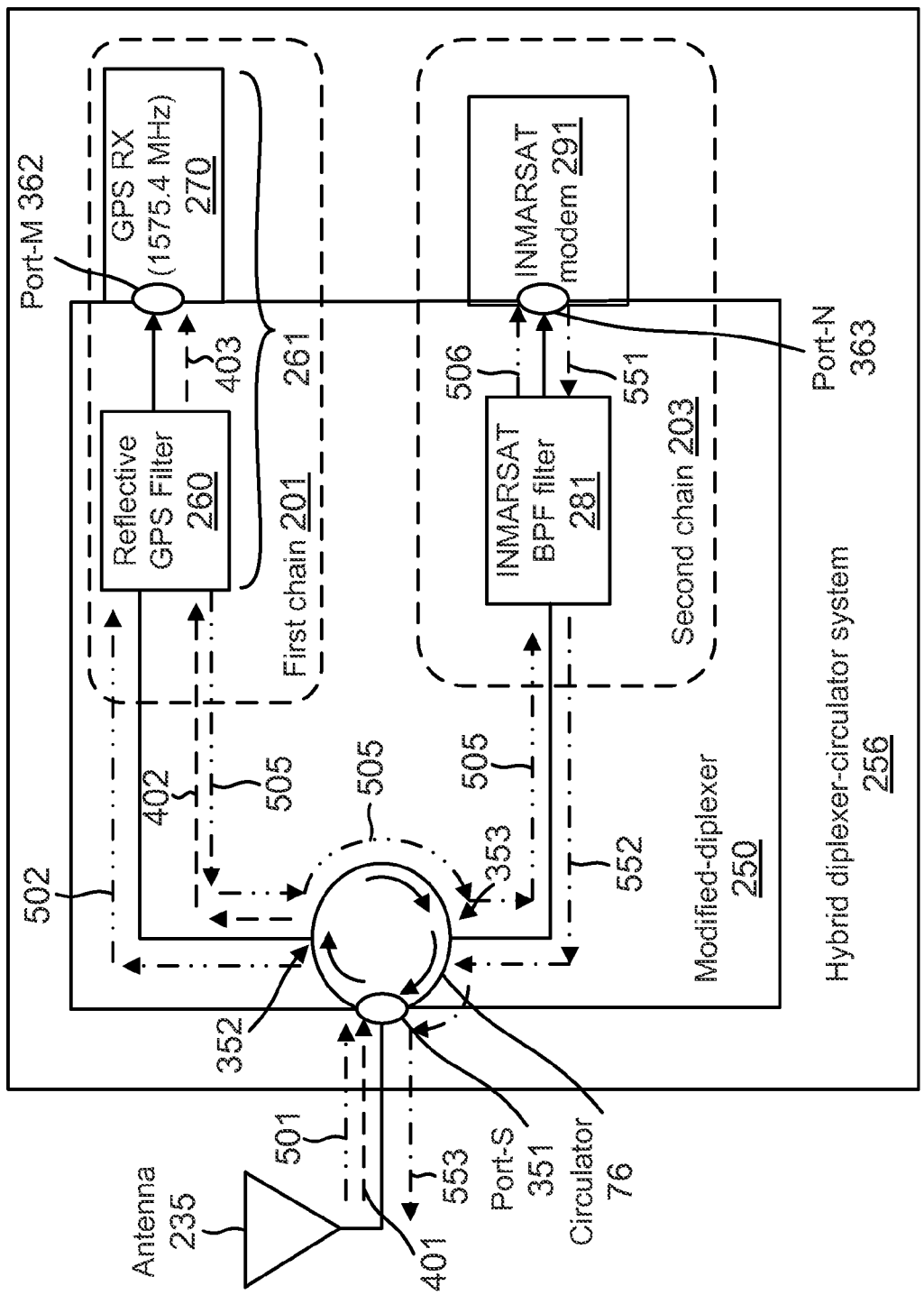

FIGS. 1, 2A, and 2B are block diagrams of embodiments of a hybrid diplexer-circulator system in accordance with the present application. FIG. 1 is a block diagram of a hybrid diplexer-circulator system 155. The hybrid diplexer-circulator system 155 includes a global positioning system (GPS) receiver 170 and a satellite modem 190 both sharing a common antenna 135. In this architecture, a circulator 75 and a modified-diplexer 150 are used as a frontend module for connecting a GPS receiver 170 and a satellite modem 190 through a common antenna 135. In this hybrid diplexer-circulator system 155, an input signal (shown an input signals 501 and 401) is not equally divided between the first chain 101 and the second chain 102 at the port 301 of the modified-diplexer 150. Rather, the input signal from the common antenna 135 (e.g., input signals 501 and 401) is fully coupled to the first chain 101 via the first circulator port 302. None of input signal from the common antenna 135 circulates through the circulator 75 to the second chain 102.

The hybrid diplexer-circulator system 155 includes a circulator 75 and a modified-diplexer 150. The circulator 75 includes a first circulator-port 301, a second circulator-port 302, and a third circulator-port 303. The first circulator-port 301 is communicatively coupled to an antenna 135. The modified-diplexer 150 includes a first diplexer-port 301, a second diplexer-port 312, and a third diplexer-port 313. The first diplexer-port 301 of the modified-diplexer 150 is communicatively coupled to an antenna 135, thus the first circulator-port 301 of the circulator 75 is shared as a first diplexer-port 301 of the modified-diplexer 150.

The antenna 135 is configured to receive first signals 401 having a first frequency and second signals 501 having a second frequency, and to transmit third signals 553 having a third frequency. The second circulator-port 302 is communicatively coupled to a first chain 101. The first chain 101 includes a receiver module 161. The receiver module 161 includes a filter 160 (referred to herein as a first filter 160) and a receiver 170.

The third circulator-port 303 is communicatively coupled to a second chain 102. The second chain 102 includes a second filter 180 and satellite modem 190. The second filter 180 is also referred to herein as satellite-modem filter 180. In this architecture, the second filter 180 in satellite-modem path is not required. In order to further reduce the loss in the second chain 102, the second filter 180 is removed from the second chain 102.

The first chain 101 operable to receive first-frequency signals 402 having a first frequency and to reflect second-frequency signals 502 having a second frequency. The receiver 170 is configured to receive the first-frequency signals 403. The second diplexer-port 312 (port M) is in the first chain 101 between the filter 160 and the receiver 170. The second diplexer-port 312 is communicatively coupled to input the first-frequency signals 403 from the filter 160 and is communicatively coupled to output the first-frequency signals 403 to the receiver 170.

The filter 160 is operable to pass forward the first-frequency signals 403 to be received by the receiver 170 and to reflect the second-frequency signals 502 in put from the second circulator-port 302 back to the second circulator-port 302 as second-frequency signals 505. The second-frequency signals 505 reflected from the filter 160 are passed to the third circulator-port 303 from the second circulator port 302. The second-frequency signals 505 reflected from the filter 160 are passed from the third circulator-port 303 to the third diplexer-port 313. The filter 160 is also referred to herein as a first filter 160.

The second chain 102 is operable to receive the second-frequency signals 505 reflected from the first chain 101, and to transmit the third-frequency signals 551 having a third frequency. The third circulator-port 303 of the circulator 75 is communicatively coupled to the third diplexer-port 313 via the second filter 180. In one implementation of this embodiment, the third circulator-port 303 is directly communicatively coupled to the third diplexer-port 313. The third diplexer-port 313 (port N) in the second chain 102 is communicatively coupled to: 1) input the second-frequency signals 505 reflected by the first chain 101; 2) output the second-frequency signals 506 to be received by the satellite modem 190; 3) input the third-frequency signals 551 transmitted by the satellite modem 190; and 4) output the third-frequency signals 552 to the third circulator-port 303 (via the second filter 180).

The hybrid diplexer-circulator system 255 of FIG. 2A differs from the hybrid diplexer-circulator system 155 of FIG. 1 in that the first filter 160 is a reflective global positioning system (GPS) filter 260 and the receiver 170 is a GPS receiver 270. The hybrid diplexer-circulator system 250 of FIG. 2A also differs from the hybrid diplexer-circulator system 155 of FIG. 1 in that the satellite modem 190 is an Iridium modem 290 and the second filter 180 is an Iridium filter 280. Iridium receives and transmits frequencies in the range of 1616 MHz to 1626 MHz. In this embodiment, the first frequency is 1575.4 MHz, the second frequency is 1616 MHz, and the third frequency is 1626 MHz.

The hybrid diplexer-circulator system 255 of FIG. 2A functions to prevent saturation of the GPS receiver 270 that shares an antenna 235 with the Iridium modem 290. The reflective GPS filter 260 reflects second frequency of 1616 MHz and transmits the first frequency of 1575.4 MHz. In one implementation of this embodiment, the reflective GPS filter 260 is a surface acoustic wave (SAW) filter in the first chain 201. The hybrid diplexer-circulator system 255 includes a reflective GPS filter 260, a GPS receiver 270, a circulator 76, an Iridium band pass filter 280, and an Iridium modem 290 that respectively function in a manner similar to the first filter 160, the receiver 170, the circulator 75, the second filter 180, and the Iridium satellite modem 190 of the hybrid diplexer-circulator system 155 of FIG. 1.

The hybrid diplexer-circulator system 256 of FIG. 2B differs from the hybrid diplexer-circulator system 155 of FIG. 1 in that the first filter 160 is a reflective global positioning system (GPS) filter 260 and the receiver 170 is a GPS receiver 270. The hybrid diplexer-circulator system 256 of FIG. 2B differs from the hybrid diplexer-circulator system 255 of FIG. 2A in that the satellite modem 190 is an INternational MARitime SATellite (INMARSAT) modem 291 and the second filter 180 is an INMARSAT filter 281. The receive frequency for INMARSAT is 1525 MHz to 1559 MHz and transmit frequency is 1626 MHz to 1660 MHz. In this embodiment, the first frequency is 1575.4 MHz, the second frequency is within the range of 1525 MHz to 1559 MHz, and the third frequency is within the range of 1626 MHz to 1660 MHz.

The hybrid diplexer-circulator system 256 of FIG. 2B functions to prevent saturation of the GPS receiver 270 that shares an antenna 235 with the INMARSAT modem 291. The reflective GPS filter 260 reflects second frequency within the range of 1525 MHz to 1559 MHz and transmits the first frequency at 1575.4 MHz. In one implementation of this embodiment, the reflective GPS filter 260 is a surface acoustic wave (SAW) filter in the first chain 201.

The hybrid diplexer-circulator system 256 includes a reflective GPS filter 260, a GPS receiver 270, a circulator 76, an INMARSAT band pass filter (BPF) 281, and an INMARSAT modem 291 that respectively function in a manner similar to the first filter 160, the receiver 170, the circulator 75, the second filter 180, and the Iridium satellite modem 190 of the hybrid diplexer-circulator system 155 of FIG. 1. The term "Iridium/INternational MARitime SATellite (INMARSAT)" as used herein indicates either Iridium or INternational MARitime SATellite (INMARSAT).

Figure 3:
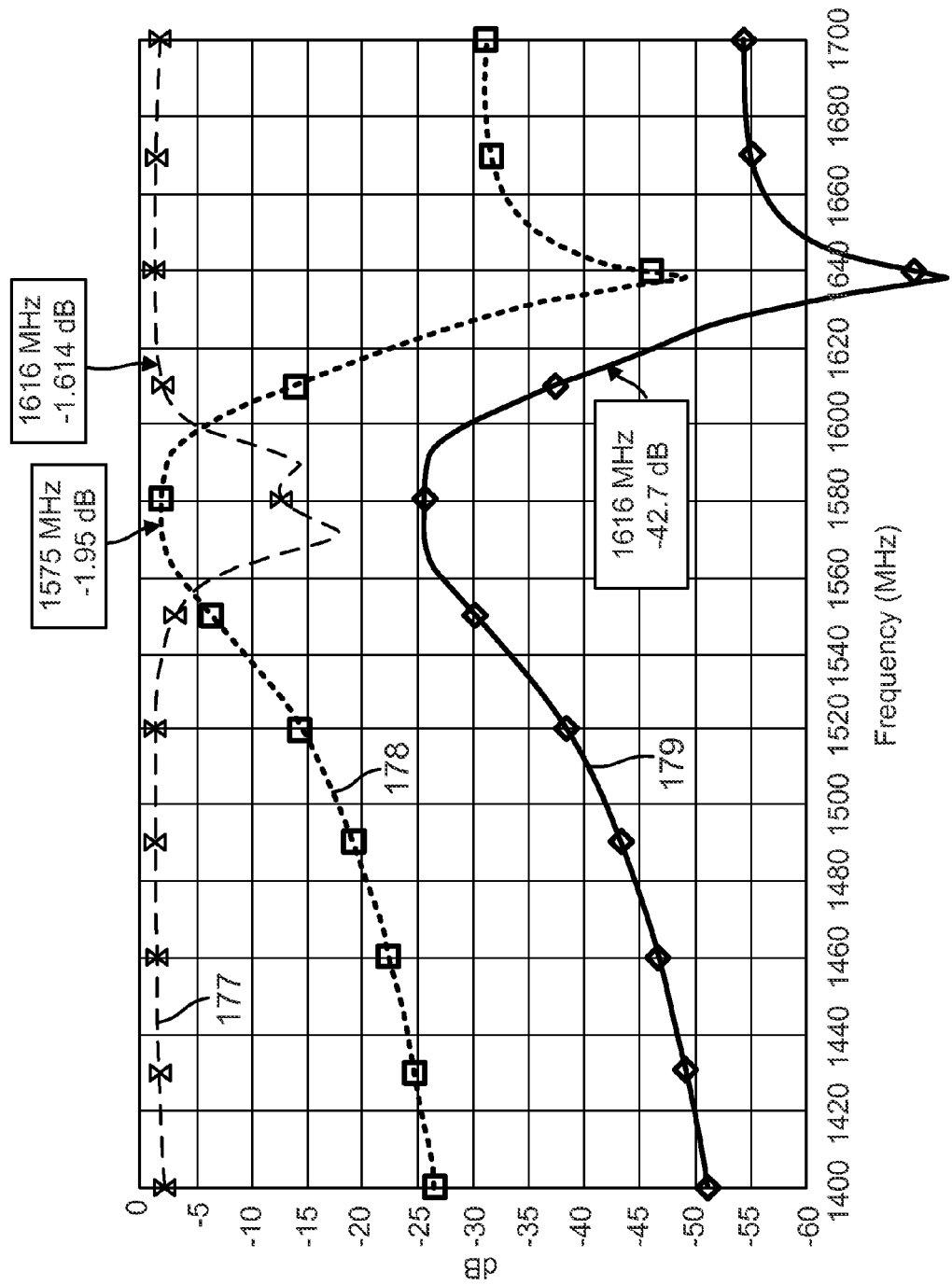
FIG. 3 shows simulation of insertion loss and isolation between an Iridium modem and a GPS receiver for the hybrid diplexer-circulator system of FIG. 2A.

FIG. 3 shows simulation of insertion loss and isolation between an Iridium modem 290 and a GPS receiver 270 for the hybrid diplexer-circulator system 255 of FIG. 2A. The simulation shown in FIG. 3 shows that the GPS insertion loss is reduced by 1.5 dB and isolation between Iridium modem 290 and GPS receiver 270 is about 40 dB. Thus the isolation between Iridium modem 290 and GPS receiver 270 increased by 23 dB in comparison to the prior art diplexer system 55 shown in FIG. 4. Thus, the advantages of the hybrid diplexer-circulator system 255 are: 1) the insertion loss in the first chain 201 is reduced by 1.5 dB compared to the prior art diplexer system 55; 2) greater than 43 dB isolation is achieved between Iridium transmitted signal 551 and GPS receiver 270 in comparison to 20 dB achieved by the prior art diplexer system 55; and 3) the insertion loss in the second chain 202 is improved by 0.5 dB over the prior art diplexer system 55.

Figure 6:
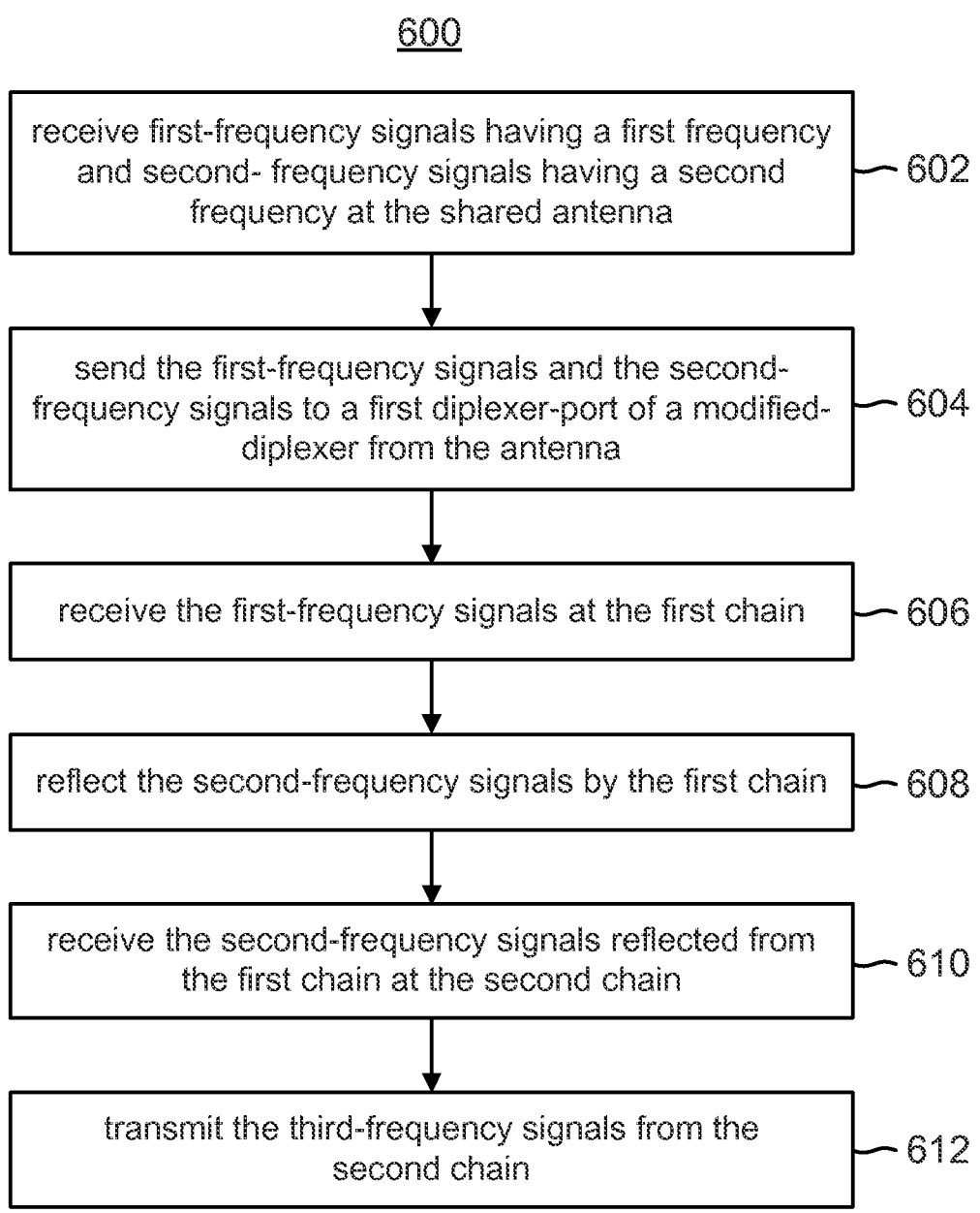
FIG. 6 is a flow diagram of a method to prevent saturation of a receiver sharing an antenna with a satellite modem in accordance with the present application.

The operation of the hybrid diplexer-circulator system is now described. FIG. 6 is a flow diagram of a method 600 to prevent saturation of a receiver sharing an antenna with a satellite modem in accordance with the present application. Method 600 is described with reference to the embodiment of the hybrid diplexer-circulator system 155 of FIG. 1. However, method 600 can be implemented by the hybrid diplexer-circulator system 255 of FIG. 2A, the hybrid diplexer-circulator system 256 of FIG. 2B, or other embodiments of a hybrid diplexer-circulator system configured as described herein, as is understandable to one skilled in the art.

At block 602, first-frequency signals 401 having a first frequency of 1575.4 MHz and second-frequency signals 501 having a second frequency of 1616 MHz are received at the shared antenna 135. The first frequency and second frequency are separated by less than five percent of the first frequency.

At block 604, the first-frequency signals 401 and the second-frequency signals 501 are sent to a first diplexer-port 301 of a modified-diplexer 150 from the antenna 135. The first diplexer-port 301 is shared as a first circulator-port 301 of a circulator 75 of the modified-diplexer 150. The modified-duplexer 150 includes a first chain 101 communicatively coupled between a second circulator-port 302 and a second diplexer-port 312 and a second chain 102 communicatively coupled between a third circulator-port 303 and a third diplexer-port 313. The second circulator-port 302 is part of the first chain 101. The third circulator-port 303 is part of the second chain 102.

At block 606, the first-frequency signals 402 are received at the first chain 101. The first-frequency signals 402 are passed forward through a reflective filter 160 in the first chain 101 as first-frequency signals 403. The first-frequency signals 403 are sent from the filter 160 as input to the second diplexer-port 312 (port M) in the first chain 101. The first-frequency signals 403 sent from the filter 160 in the first chain 101 are input to the second diplexer-port 312 (port M) in the first chain 101. The first-frequency signals 403 are input to the receiver 170 in the first chain 101 via second diplexer-port 312.

At block 608, the second-frequency signals 502 are reflected by the first chain 101. The second-frequency signals 502 are reflected by the reflective filter 160 in the first chain 101 as second-frequency signals 505. The second-frequency signals 505 are reflected at the filter 160 back to the second circulator-port 302. The reflected second-frequency signals 505 enter the second circulator-port 302, are passed to the third circulator-port 303 from the second circulator-port 302 within the circulator 75, and are passed from the third circulator-port 303 to the third diplexer-port 313.

At block 610, the second-frequency signals 505 are received from the first chain 101 at the second chain 102. The second-frequency signals 505 reflected by the first chain 101 are input to the third diplexer-port 313 (port N) in the second chain 102 via an optional filter 180 in the second chain 102. Then, the second-frequency signals 506 are output from the third diplexer-port 313 to the satellite modem 190 in the second chain 102.

At block 612, the third-frequency signals 551 are transmitted from the second chain 102. The third-frequency signals 551 are transmitted from the satellite modem 190 as input to the third diplexer-port 313. The third diplexer-port 313 passes the third-frequency signals 551 as output at the third diplexer-port 313 to the third circulator-port 303. The third-frequency signals 552 are output from the third diplexer-port 313 to the third circulator-port 303 via the filter 180 in the second chain 102. The third-frequency signals 552 are passed from the third circulator-port 303 to the first circulator-port 301 and are output as third-frequency signals 553 to be transmitted from the antenna 135.

In this manner, the hybrid diplexer-circulator system prevents saturation of a receiver sharing an antenna with a satellite modem.

Example Embodiments

Example 1 includes a hybrid diplexer-circulator system, comprising: a circulator including: a first circulator-port communicatively coupled to an antenna; a second circulator-port communicatively coupled to a first chain that comprises a receiver module, the first chain operable to receive first-frequency signals having a first frequency and to reflect second-frequency signals having a second frequency; and a third circulator-port communicatively coupled to a second chain that comprises a satellite modem, the second chain operable to receive the second-frequency signals reflected from the first chain, and to transmit third-frequency signals having a third frequency; a modified-diplexer, wherein the first circulator-port of the circulator is shared as a first diplexer-port of the modified-diplexer, the modified-diplexer further comprising: a second diplexer-port in the first chain communicatively coupled to input the first-frequency signals from a filter in the first chain and communicatively coupled to output the first-frequency signals to a receiver in the first chain, a third diplexer-port in the second chain communicatively coupled to: input the second-frequency signals reflected by the first chain, output the second-frequency signals to be received by the satellite modem, input the third-frequency signals transmitted by the satellite modem, and output the third-frequency signals to the third circulator-port.

Example 2 includes the hybrid diplexer-circulator system of Example 1, wherein the receiver module of the first chain includes: the filter; and the receiver configured to receive the first-frequency signals.

Example 3 includes the hybrid diplexer-circulator system of any of Examples 1-2, wherein the filter is operable to: pass forward the first-frequency signals to be received by the receiver; and reflect the second-frequency signals from the second circulator-port back to the second circulator-port, wherein the second-frequency signals reflected from the filter are passed to the third circulator-port, and wherein the second-frequency signals reflected from the filter are passed from the third circulator-port to the third diplexer-port.

Example 4 includes the hybrid diplexer-circulator system of any of Examples 1-3, wherein the filter is a first filter, wherein the second chain includes a second filter and the satellite modem, and wherein the third circulator-port is communicatively coupled to the third diplexer-port via the second filter.

Example 5 includes the hybrid diplexer-circulator system of Example 4, wherein the satellite modem is an Iridium modem and the second filter is an Iridium filter.

Example 6 includes the hybrid diplexer-circulator system of Example 5, wherein the filter is a reflective global positioning system (GPS) filter and the receiver is a GPS receiver, and wherein the first frequency is 1575.4 MHz, the second frequency is 1616 MHz, and the third frequency is 1626 MHz.

Example 7 includes the hybrid diplexer-circulator system of any of Examples 4-6, wherein the satellite modem is an INternational MARitime SATellite (INMARSAT) modem and the second filter is an INMARSAT filter.

Example 8 includes the hybrid diplexer-circulator system of any of Examples 1-7, wherein the filter is a reflective GPS filter and the receiver is a GPS receiver, and wherein the first frequency is 1575.4 MHz.

Example 9 includes the hybrid diplexer-circulator system of Example 8, wherein the receiver module includes the reflective GPS filter and the GPS receiver.

Example 10 includes a method to prevent saturation of a receiver sharing an antenna with a satellite modem, the method comprising: receiving first-frequency signals having a first frequency and second-frequency signals having a second frequency at the shared antenna, the first frequency and second frequency being separated by less than five percent of the first frequency; sending the first-frequency signals and the second-frequency signals to a first diplexer-port of a modified-diplexer from the antenna, wherein the first diplexer-port is shared as a first circulator-port of a circulator of the modified-diplexer, the modified-duplexer including: a first chain communicatively coupled between a second circulator-port and a second diplexer-port; and a second chain communicatively coupled between a third circulator-port and a third diplexer-port; receiving the first-frequency signals at the first chain; reflecting the second-frequency signals by the first chain; and receiving the second-frequency signals reflected from the first chain at the second chain.

Example 11 includes the method of Example 10, further comprising: passing the reflected second-frequency signals from the third circulator-port to the third diplexer-port.

Example 12 includes the method of any of Examples 10-11, further comprising: transmitting the third-frequency signals from the second chain.

Example 13 includes the method of any of Examples 10-12, wherein receiving the first-frequency signals at the first chain comprises passing forward the first-frequency signals through a filter in the first chain to be received by the receiver in the first chain.

Example 14 includes the method of any of Examples 10-13, wherein reflecting the second-frequency signals by the first chain comprises reflecting the second-frequency signals at a filter back to the second circulator-port.

Example 15 includes the method of any of Examples 10-14, wherein receiving the second-frequency signals reflected from the first chain at the second chain comprises passing the second-frequency signals reflected from a filter in the first chain to the third circulator-port from the second circulator-port.

Example 16 includes the method of any of Examples 10-15, further comprising: inputting the second-frequency signals reflected by the first chain at the third diplexer-port in the second chain via a filter in the second chain; and outputting the second-frequency signals from the third diplexer-port to the satellite modem in the second chain.

Example 17 includes the method of Example 16, further comprising: inputting the third-frequency signals transmitted from the satellite modem at the third diplexer-port from the satellite modem; and outputting the third-frequency signals from the third diplexer-port to the third circulator-port via the filter in the second chain.

Example 18 includes the method of any of Examples 10-17, further comprising; inputting the first-frequency signals from the filter in the first chain at the second diplexer-port in the first chain; and outputting the first-frequency signals to the receiver in the first chain.

Example 19 includes the method of any of Examples 10-18, wherein the receiver is a global positioning system (GPS) receiver, wherein the satellite modem is an Iridium modem, and wherein receiving the first-frequency signals at the first chain comprises: passing forward the first-frequency signals through a reflective GPS filter in the first chain; inputting the first-frequency signals from the GPS filter at the second diplexer-port in the first chain; and outputting the first-frequency signals from the second diplexer-port to be received at the GPS receiver in the first chain; wherein reflecting the second-frequency signals by the first chain comprises: reflecting the second-frequency signals at the reflective GPS filter back to the second circulator-port, the method further comprising: inputting the third-frequency signals transmitted from the Iridium modem at the third diplexer-port; and outputting the third-frequency signals from the third diplexer-port to the third circulator-port via an Iridium filter in the second chain.

Example 20 includes a hybrid diplexer-circulator system, comprising: a circulator including: a first circulator-port communicatively coupled to a shared antenna configured to: input first-frequency signals having a first frequency and second-frequency signals having a second frequency; and to transmit third signals having a third frequency; a second circulator-port communicatively coupled to a first chain that comprises a reflective global positioning system (GPS) filter and a GPS receiver, the reflective GPS filter operable to reflect the second-frequency signals and operable to pass through the first frequency signals, the GPS receiver operable to receive the first-frequency signals; and a third circulator-port communicatively coupled to a second chain that comprises an Iridium/INternational MARitime SATellite (INMARSAT) band pass filter and an Iridium/INMARSAT modem, the Iridium/INMARSAT band pass filter operable to pass through the second-frequency signals reflected from the reflective GPS filter, the Iridium/INMARSAT modem operable to receive the second frequency signals passed through the Iridium/INMARSAT band pass filter and to transmit third-frequency signals to the third circulator-port; a modified-diplexer, wherein the first circulator-port is shared as a first diplexer-port of the modified-diplexer, the modified-diplexer further comprising: a second diplexer-port in the first chain communicatively coupled to input the first-frequency signals from the reflective GPS filter and communicatively coupled to output the first-frequency signals to the GPS receiver, a third diplexer-port in the second chain communicatively coupled to: input the second-frequency signals passed through the Iridium/INMAR- SAT band pass filter, output the second-frequency signals to the Iridium/INMARSAT modem, input the third-frequency signals from the Iridium/INMARSAT modem, and output the third-frequency signals to the third circulator-port via the Iridium/INMARSAT band pass filter.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present application. Therefore, it is manifestly intended that this invention be limited only by the claims and the equivalents thereof.

What is claimed is:

1. A hybrid diplexer-circulator system, comprising:
    a circulator including:
        a first circulator-port communicatively coupled to an antenna;
        a second circulator-port communicatively coupled to a first chain that comprises a receiver module, the first chain operable to receive first-frequency signals having a first frequency and to reflect second-frequency signals having a second frequency; and
        a third circulator-port communicatively coupled to a second chain that comprises a satellite modem, the second chain operable to receive the second-frequency signals reflected from the first chain, and to transmit third-frequency signals having a third frequency;
    a modified-diplexer, wherein the first circulator-port of the circulator is shared as a first diplexer-port of the modified-diplexer, the modified-diplexer further comprising:
        a second diplexer-port in the first chain communicatively coupled to input the first-frequency signals from a filter in the first chain and communicatively coupled to output the first-frequency signals to a receiver in the first chain,
        a third diplexer-port in the second chain communicatively coupled to:
            input the second-frequency signals reflected by the first chain,
            output the second-frequency signals to be received by the satellite modem,
            input the third-frequency signals transmitted by the satellite modem, and
            output the third-frequency signals to the third circulator-port.

2. The hybrid diplexer-circulator system of claim 1, wherein the receiver module of the first chain includes:
    the filter; and
    the receiver configured to receive the first-frequency signals.

3. The hybrid diplexer-circulator system of claim 1, wherein the filter is operable to:
    pass forward the first-frequency signals to be received by the receiver; and
    reflect the second-frequency signals from the second circulator-port back to the second circulator-port, wherein the second-frequency signals reflected from the filter are passed to the third circulator-port, and wherein the second-frequency signals reflected from the filter are passed from the third circulator-port to the third diplexer-port.

4. The hybrid diplexer-circulator system of claim 1, wherein the filter is a first filter, wherein the second chain includes a second filter and the satellite modem, and wherein the third circulator-port is communicatively coupled to the third diplexer-port via the second filter.

5. The hybrid diplexer-circulator system of claim 4, wherein the satellite modem is an Iridium modem and the second filter is an Iridium filter.

6. The hybrid diplexer-circulator system of claim 5, wherein the filter is a reflective global positioning system (GPS) filter and the receiver is a GPS receiver, and wherein the first frequency is 1575.4 MHz, the second frequency is 1616 MHz, and the third frequency is 1626 MHz.

7. The hybrid diplexer-circulator system of claim 4, wherein the satellite modem is an INternational MARitime SATellite (INMARSAT) modem and the second filter is an INMARSAT filter.

8. The hybrid diplexer-circulator system of claim 1, wherein the filter is a reflective GPS filter and the receiver is a GPS receiver, and wherein the first frequency is 1575.4 MHz.

9. The hybrid diplexer-circulator system of claim 8, wherein the receiver module includes the reflective GPS filter and the GPS receiver.

10. A method to prevent saturation of a receiver sharing an antenna with a satellite modem, the method comprising:
    receiving first-frequency signals having a first frequency and second-frequency signals having a second frequency at the shared antenna, the first frequency and second frequency being separated by less than five percent of the first frequency;
    sending the first-frequency signals and the second-frequency signals to a first diplexer-port of a modified-diplexer from the antenna, wherein the first diplexer-port is shared as a first circulator-port of a circulator of the modified-diplexer, the modified-duplexer including:
        a first chain communicatively coupled between a second circulator-port and a second diplexer-port; and
        a second chain communicatively coupled between a third circulator-port and a third diplexer-port;
    receiving the first-frequency signals at the first chain;
    reflecting the second-frequency signals by the first chain; and
    receiving the second-frequency signals reflected from the first chain at the second chain.

11. The method of claim 10, further comprising:
    passing the reflected second-frequency signals from the third circulator-port to the third diplexer-port.

12. The method of claim 10, further comprising:
    transmitting the third-frequency signals from the second chain.

13. The method of claim 10, wherein receiving the first-frequency signals at the first chain comprises passing forward the first-frequency signals through a filter in the first chain to be received by the receiver in the first chain.

14. The method of claim 10, wherein reflecting the second-frequency signals by the first chain comprises reflecting the second-frequency signals at a filter back to the second circulator-port.

15. The method of claim 10, wherein receiving the second-frequency signals reflected from the first chain at the second chain comprises passing the second-frequency signals reflected from a filter in the first chain to the third circulator-port from the second circulator-port.

16. The method of claim 10, further comprising:
    inputting the second-frequency signals reflected by the first chain at the third diplexer-port in the second chain via a filter in the second chain; and
    outputting the second-frequency signals from the third diplexer-port to the satellite modem in the second chain.

17. The method of claim 16, further comprising:
inputting the third-frequency signals transmitted from the satellite modem at the third diplexer-port from the satellite modem; and
outputting the third-frequency signals from the third diplexer-port to the third circulator-port via the filter in the second chain.

18. The method of claim 10, further comprising;
inputting the first-frequency signals from the filter in the first chain at the second diplexer-port in the first chain; and
outputting the first-frequency signals to the receiver in the first chain.

19. The method of claim 10, wherein the receiver is a global positioning system (GPS) receiver, wherein the satellite modem is an Iridium modem, and wherein receiving the first-frequency signals at the first chain comprises:
passing forward the first-frequency signals through a reflective GPS filter in the first chain;
inputting the first-frequency signals from the GPS filter at the second diplexer-port in the first chain; and
outputting the first-frequency signals from the second diplexer-port to be received at the GPS receiver in the first chain;
wherein reflecting the second-frequency signals by the first chain comprises:
reflecting the second-frequency signals at the reflective GPS filter back to the second circulator-port, the method further comprising:
inputting the third-frequency signals transmitted from the Iridium modem at the third diplexer-port; and
outputting the third-frequency signals from the third diplexer-port to the third circulator-port via an Iridium filter in the second chain.

20. A hybrid diplexer-circulator system, comprising:
a circulator including:
a first circulator-port communicatively coupled to a shared antenna configured to: input first-frequency signals having a first frequency and second-frequency signals having a second frequency; and to transmit third signals having a third frequency;
a second circulator-port communicatively coupled to a first chain that comprises a reflective global positioning system (GPS) filter and a GPS receiver, the reflective GPS filter operable to reflect the second-frequency signals and operable to pass through the first frequency signals, the GPS receiver operable to receive the first-frequency signals; and
a third circulator-port communicatively coupled to a second chain that comprises an Iridium/INternational MARitime SATellite (INMARSAT) band pass filter and an Iridium/INMARSAT modem, the Iridium/INMARSAT band pass filter operable to pass through the second-frequency signals reflected from the reflective GPS filter, the Iridium/INMARSAT modem operable to receive the second frequency signals passed through the Iridium/INMARSAT band pass filter and to transmit third-frequency signals to the third circulator-port;
a modified-diplexer, wherein the first circulator-port is shared as a first diplexer-port of the modified-diplexer, the modified-diplexer further comprising:
a second diplexer-port in the first chain communicatively coupled to input the first-frequency signals from the reflective GPS filter and communicatively coupled to output the first-frequency signals to the GPS receiver,
a third diplexer-port in the second chain communicatively coupled to:
input the second-frequency signals passed through the Iridium/INMARSAT band pass filter,
output the second-frequency signals to the Iridium/INMARSAT modem,
input the third-frequency signals from the Iridium/INMARSAT modem, and
output the third-frequency signals to the third circulator-port via the Iridium/INMARSAT band pass filter.

* * * * *